United States Patent [19]
Stender et al.

[11] Patent Number: 5,522,649
[45] Date of Patent: Jun. 4, 1996

[54] PROCESS AND APPARATUS FOR MONITORING A TRIALER BRAKE FOR OVERLOAD

[75] Inventors: Axel Stender, Hameln; Hartmut Schappler, Hanover, both of Germany

[73] Assignee: Wabco Standard GmbH, Hanover, Germany

[21] Appl. No.: 58,910

[22] Filed: May 5, 1993

[30] Foreign Application Priority Data

May 9, 1992 [DE] Germany ............... 42 15 341.7

[51] Int. Cl.⁶ .................................................. B60T 17/22
[52] U.S. Cl. ................................................ 303/7; 188/122 R
[58] Field of Search ....................... 303/7, 8, 9, 20, 303/15, 3, DIG. 1–4; 188/112 A, 112 R

[56] References Cited

U.S. PATENT DOCUMENTS

| | | | |
|---|---|---|---|
| 4,060,284 | 11/1977 | Steiner | 188/112 R |
| 4,763,958 | 8/1988 | Ohrgard | 188/112 R |
| 5,132,664 | 7/1992 | Feldmann et al. | 303/DIG. 4 |
| 5,286,094 | 2/1994 | Milner | 188/112 R |

FOREIGN PATENT DOCUMENTS

| | | |
|---|---|---|
| 0320602 | 12/1991 | European Pat. Off. . |
| 2752641 | 5/1979 | Germany . |
| 3742996 | 6/1989 | Germany . |
| 3920096 | 4/1990 | Germany . |

*Primary Examiner*—Matthew C. Graham
*Attorney, Agent, or Firm*—Meltzer, Lippe, Goldstein et al.

[57] ABSTRACT

In a vehicle train comprising a motor vehicle and a trailer, a process for monitoring a trailer brake for overload comprises producing an energy call-up signal during a braking action, supplying energy to a motor vehicle brake in the motor vehicle, the amount of energy being supplied to the motor vehicle being determined, at least in part, by the value of the energy call-up signal, producing a trailer energy signal, the value of the trailer energy signal being determined, at least in part, by the value of the energy call-up signal, and supplying trailer energy to a trailer brake in the trailer, the amount of trailer energy supplied to the trailer brake being determined, at least in part, by the value of the trailer energy signal. The process further comprises monitoring the coupling force appearing at a coupling between the motor vehicle and the trailer, and adjusting the coupling force based on the trailer energy signal. The process further comprises detecting that overload of the trailer brake has occurred when the value of the trailer energy signal rises in a more than transitory manner at a given call-up signal. In a preferred embodiment, overload of the trailer brake is detected only when the rise in the trailer energy signal exceeds a predetermined value.

13 Claims, 2 Drawing Sheets

PROCESS AND APPARATUS FOR MONITORING A TRIALER BRAKE FOR OVERLOAD

BACKGROUND OF THE INVENTION

The instant invention relates to a process and an apparatus for monitoring at least one trailer brake for the detection overload.

A process of this type is described in EP0 320 602 B1. In this known process, a ratio is formed between a motor vehicle energy signal and a trailer energy signal. This ratio is observed during braking and overload of the trailer brake is recognized when this ratio changes at a predetermined rate or faster.

The present invention has as its object to propose a different process for detecting brake overload of a trailer brake.

SUMMARY OF THE INVENTION

In a vehicle train comprising a motor vehicle and a trailer, a process for monitoring a trailer brake for overload comprises producing an energy call-up signal during a braking action, supplying energy to a motor vehicle brake in the motor vehicle, the amount of energy being supplied to the motor vehicle brake being determined, at least in part, by the value of the energy call up signal, producing a trailer energy signal, the value of the trailer energy signal being determined, at least in part, by the value of the energy call-up signal, and supplying trailer energy to a trailer brake in the trailer, the amount of trailer energy supplied to the trailer brake being determined, at least in part, by the value of the trailer energy signal. The process further comprises measuring a coupling force appearing at a coupling between the motor vehicle and the trailer, and adjusting the coupling force based on the trailer energy signal. The process further comprises detecting that overload of the trailer brake has occurred when the value of the trailer energy signal rises in a more than transitory manner at a given call-up signal. In a preferred embodiment, overload of the trailer brake is detected only when the rise in the trailer energy signal reaches a predetermined value.

In the context of this invention, a motor vehicle brake or a trailer brake is a part of a motor vehicle braking system or a trailer braking system respectively which generates the brake force directly. In the case of a brake which is not wear-resistant, the motor vehicle brake or the trailer brake refers to an assembly comprising a wheel brake, a brake application device, and the transmission elements which may be installed between them.

In a manner described further below, the invention utilizes the known fact that an overloaded vehicle brake shows a drop in braking force at a given energy call-up command. For this phenomenon, the term "fading" is in general use.

The instant invention is suitable for any kind of energy which may be used in connection with a vehicle brake. Pressure, including the pressure difference between atmospheric pressure and an underpressure, electrical energy or human energy may be mentioned as examples. When pressure is the energy source, compressed air and hydraulic pressure means as well as combinations thereof are commonly used as the energy carriers. It is also a common practice to use different types of energy for brake actuation and for control of the actuation, e.g., pressure as the actuating energy and electrical energy as the control energy. The above-mentioned brake application device is normally made in the form of a brake cylinder when the energy is pressure.

Additional advantages of the invention are indicated in the description below through the embodiments shown in the drawings. The same reference numbers are used throughout for elements having the same function, full lines being used for (actuating) energy lines, broken lines for control lines, and dot-and-dash lines for signal lines.

DETAILED DESCRIPTION OF PREFERRED EMBODIMENTS

In the following, all explanations made for vehicle trains in which a motor vehicle pulls a trailer (referred to herein as a "traction" or "pulling" motor vehicle), refer as well to vehicle trains wherein the motor vehicle pushes the trailer (referred to herein as a "pushing" motor vehicle), such as are commonly used in rail traffic and occur during maneuvering road vehicle trains.

Figure 1:
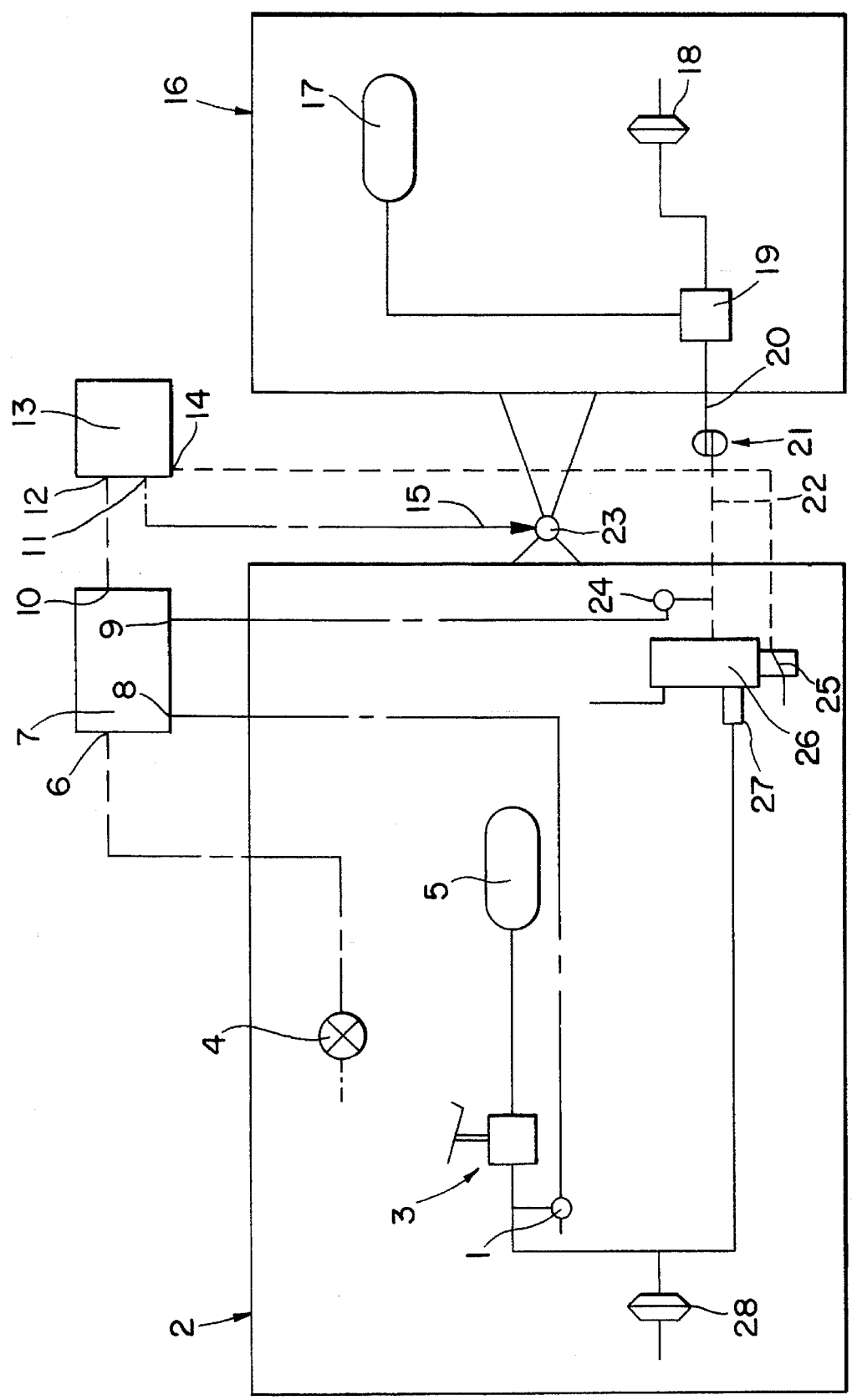
FIG. 1 schematically shows a vehicle train with a motor vehicle brake and a trailer brake as well as a device for monitoring the trailer brake for overload.

The vehicle train shown in FIG. 1 comprises a motor vehicle and a trailer which it pulls, both generally given the reference numbers 2 and 16 respectively, which are coupled together via a coupling 23. Coupling 23 may be a drawbar coupling or a fifth wheel coupling, depending on whether the vehicle is designed as a drawbar train or a semitrailer train.

The motor vehicle 2 contains a motor vehicle brake 28 while the trailer 16 contains a trailer brake 18, both of which can be actuated by a supply of energy and both of which are symbolically represented in the drawings by a brake application device. Each of the mentioned brakes may be the only one in the appertaining vehicle or they may be representative of a plurality of such brakes in the appertaining vehicle.

The motor vehicle brake 28 is part of a motor vehicle braking system (3, 5, 26, 28) which additionally comprises a motor vehicle energy reserve 5, a brake value generator 3, a trailer energy setter 26, and the appertaining energy supply lines. The brake value generator 3 is connected on the one hand to energy reserve 5, and on the other hand to the motor vehicle brake 28 as well as to a first control input 27 of the trailer energy setter 26. The trailer energy setter 26 is provided with a second electric control input 25 which will be discussed in more detail further below.

The trailer brake 18 is part of a trailer braking system (17, 18, 19) which additionally comprises a trailer energy reserve 17 and a trailer control device 19 as well as the appertaining energy supply lines. A control input of the trailer control device 19 is connected via a trailer control circuit (20, 21, 22), located partly in the trailer 16 and containing a control connector 21, to the output of the trailer energy setter 26 in the motor vehicle 2.

The motor vehicle braking system (3, 5, 26, 28) and the trailer braking system (17, 18, 19) may each be a service braking system or a part thereof, an auxiliary braking system or a (wear-resistant) permanent braking system such as are known and required in many countries by law. If the motor vehicle braking system (3, 5, 26, 28) and/or the trailer braking system (17, 18, 19) are only part of the operating braking system, they represent one of at least two service brake circuits, separated from each other in a known manner, of the complete braking system.

To supply the energy reserves 5 and 17 as well as the trailer energy setter 26 with energy, an energy producing source of known design and not shown, including the appertaining distribution and safety devices and energy circuits, is provided in the motor vehicle 2.

The components of the braking system mentioned so far as well as their interactions are known. When pressure is used as the energy source and one or more pressure means as the energy carriers, the energy reserves 5 and 17 are designed as pressure storage devices, the brake value generator 3 as a foot or hand operated valve, the trailer energy setter 26 as a trailer control valve, and the trailer control device 19 as a trailer brake valve.

For the purpose of braking, the driver of the vehicle initiates an energy call-up signal in the form of an actuating force and/or an actuating distance in the brake value generator 3. The latter then allows energy to pass from the energy reserve 5 to the motor vehicle brake 28 and, to the first control input 27 of the trailer energy setter 26, the amount of energy being determined by the value of the energy call-up signal. The amount of the energy allowed to pass through is therefore representative of the energy call-up signal introduced in the brake value generator 3 so that it may be said that the brake value generator 3 receives and transmits an energy call-up signal at the same time. As a result of the signal received by its first control input 27, the trailer energy setter 26 is prompted to transmit an appropriate trailer energy signal via the trailer control circuit (20, 21, 22) to the trailer control device 19. The latter is thereby prompted to let energy from the trailer energy reserve 17 pass through to the trailer brake 18 in an amount corresponding to the value of the trailer energy signal. However, before the energy that has passed the brake value generator 3 or the trailer control device 19 is allowed to enter to the pertinent brake (28 or 18), this energy may be influenced by additional devices such as load-dependent brake-pressure regulators. As a result of the arrival of energy, the motor vehicle brake 28 and the trailer brake 18 produce braking forces corresponding to the amount of energy supplied.

The driver thus controls the utilization, and determines or determines in part the effect of, the motor vehicle brake 28 and the trailer brake 18 by means of the brake value generator 3.

A coupling force control is superimposed on this driver control. A force sensor 15 and a controller 13 are used for this purpose. The force sensor 15 whose output is connected to an input 11 of the controller 13 is located at the coupling 23. The output 14 of the controller 13 is connected to the second control input 25 of the trailer energy setter 26. During braking, the force sensor 15 detects the force appearing at the coupling 23 and emits a corresponding force signal to the controller 13. The controller 13 checks whether the force signal deviates from a predetermined desired value. If this is indeed the case, the controller 13 transmits a control signal to the second control input 25 of the trailer energy setter 26, causing said trailer energy setter 26 to modify the trailer energy signal in the trailer control circuit (20, 21, 22) defined by the value of the energy at its first control input 27 and thereby the braking power produced by the trailer brake 18, so that the detected deviation from the desired value of the force signal at the force sensor 15 disappears. With a draw bar train, the desired value can be zero or an admissible value in the direction of thrust or in the direction of traction. With a semitrailer train the desired value of the coupling force is determined by the fifth wheel load and is always a thrust force.

In the embodiment shown in FIG. 1, the trailer energy signal is set in the motor vehicle 2 by means of the trailer energy setter 26. It is also possible, however, to carry out this setting in a manner not shown, in the trailer 16 by means of a second electric control input of the trailer control device 19. In this case, the energy supplied to the trailer brake 18 would emit the trailer energy signal. In this embodiment, the trailer energy setter 26 would not require the second control input 25.

The trailer deceleration caused by the trailer brake 18 is taken into account or substantially taken into account by the coupling force control to the motor vehicle deceleration caused by the motor vehicle brake 28, so that no force, or only a force of admissible magnitude, is exerted by the trailer 16 on the motor vehicle 2 via coupling 23 when braking. Thus, the danger of jack-knifing of the vehicle train due to thrust or excessive thrust of the trailer 16 when braking is eliminated and the directional stability of the vehicle train is thereby improved considerably.

The mentioned components of the coupling force control are known in themselves and in their interactions.

When the coupling force control has achieved its control goal during braking, i.e., when the force signal has assumed its desired value, the trailer energy signal assumes the value of a normal trailer energy signal for a given energy call-up signal which is received or transmitted by the brake value generator 3. This value depends on the load conditions of the motor vehicle 2 and on the load conditions of the trailer 16. Before the coupling force control achieves its control goal, deviations or oscillations of the trailer energy signal from the value of a normal trailer energy signal occur. Deviations also occur as a result of disturbances after the control goal has been reached. However, these deviations are in the nature of oscillations and are only transitory thanks to the immediate intervention of the controller 13 which still continues to act before the control goal has been reached or intervenes immediately in the case of disturbances.

If the trailer brake 18 is overloaded in the course of a braking action, the braking force which it produces drops while the energy call-up signal remains unchanged, with a correspondingly unchanged normal trailer energy signal. Without the coupling force control, this fading with an intact motor vehicle brake 28 would result in thrust or greater thrust or lower traction exerted by the trailer 16, and thereby in a greater coupling force in the thrust direction or a lower coupling force in the traction direction. This is counteracted, however, by the coupling force control through a rise of the trailer energy signal and thereby through an increase of energy supplied to the trailer brake 18 and an increase of the braking force produced by the latter. The rise in trailer energy signal above the normal trailer energy signal which is produced by the fading is not transitory but persists during the entire duration of the fading of the trailer brake 18.

If the trailer brake 18 is overloaded at the beginning of a braking action as a result of previous braking actions, the trailer energy signal indicates a rise above the normal trailer energy signal from the beginning of brake application and for the entire duration of the overload condition.

A more than merely transitory increase of the trailer energy signal for a given energy call-up signal is therefore a sign of overload of the trailer brake 18. By "more than merely transitory" is meant that a drop does not occur immediately after the increase. For example, increases lasting for about 0.2–1.0 seconds could be considered more than 'transitory'.

This realization is utilized by a device (1, 7, 24) which is also shown in the embodiment of FIG. 1 to monitor the trailer brake 18 for overload. This device comprises a motor vehicle energy sensor 1, a trailer energy sensor 24, and an evaluation circuit 7. The outputs of the motor vehicle energy sensor 1 and of the trailer energy sensor 24 are connected to the inputs 8 and 9 of the evaluation circuit 7. The motor vehicle energy sensor 1 detects the energy call-up signal emitted by the brake value generator 3. However, it can also detect the energy call-up signal introduced in the brake value generator in a known, and therefore not shown, manner.

The trailer energy sensor 24 detects the trailer energy signal in the trailer control circuit (20, 21, 22). However it may also be installed along the energy circuit between the trailer control device 19 and the trailer brake 18 if the trailer energy signal is set in the trailer 16.

In addition to the signals already mentioned, load signals characterizing the load status of the motor vehicle 2 and of the trailer 16 are transmitted in a known and therefore not shown manner to the evaluation circuit 7. The evaluation circuit 7 is configured so that it determines the normal trailer energy signal for the existing (actual) energy call-up signal by using these load signals, compares it with the existing (actual) trailer energy signal and emits an output signal if the actual trailer energy signal has exceeded the normal trailer energy signal in more than a merely transitory manner.

The evaluation circuit 7 can be equipped, furthermore, with a time function element by means of which it recognizes the characteristic "not transitory" when the actual trailer energy signal has exceeded the normal trailer energy signal for a predetermined length of time, for example, for about 0.2–1.0 seconds.

The sensitivity of the reaction of the device (1, 7, 24) can be lowered in order to avoid erroneous indications by having the evaluation circuit 7 emit the output signal only when the difference between the actual and normal trailer energy signal has reached a predetermined value or values above same, for example, when the actual trailer energy signal exceeds the normal trailer energy signal by about 5to 15%

The output signal of the evaluation circuit 7 can be utilized in every known manner. In the embodiment shown in FIG. 1, two designs which can be used together or individually are indicated for that purpose. On the one hand, an output 6 of the evaluation circuit 7 is connected to the input of a warning device 4 of any desired design which is actuated by the output signal of the evaluation circuit 7. On the other hand, the controller 13 is provided with another input 12 which is connected to an output 10 of the evaluation circuit 7. The controller 13 is so designed that it is switched off upon receipt at its input 12 of an output signal from the evaluation circuit 7, so that the coupling force control will be switched off when the trailer brake 18 fades. Thereby, additional overloading of the trailer brake 18 by increased energy supply is avoided.

The evaluation circuit 7 and the controller 13 are shown outside the motor vehicle 2 and the trailer 16. This is to indicate that each of these devices can be physically installed in the motor vehicle 2 as well as in the trailer 16. The evaluation circuit 7 and the controller 13 include one or more microcomputers which are appropriately programmed to carry out their required functions. In practice, the evaluation circuit 7 and the controller 13 will normally be combined in one unit, or they may be combined with other electronic components of the motor vehicle or trailer.

If the motor vehicle brake 28 is overloaded in the course of a braking process, the braking force which it produces drops while the energy call-up signal remains unchanged. Without the coupling force control, this fading with an intact trailer brake 18 would result in traction, stronger traction, or reduced thrust by the trailer 16, and thereby in a coupling force in the direction of traction, or a reduction of the coupling force in the direction of thrust, or a greater coupling force in the direction of traction. This is, however, counteracted by the coupling force control through the lowering of the trailer energy signal and thereby through reduction of the energy supply going to the trailer brake 18 and the reduction of the braking force which it produces. The drop of the trailer energy signal from the normal trailer energy signal which is thus produced does not occur in a transitory manner but persists during the entire duration of the fading of the motor vehicle brake 28.

If the motor vehicle brake 28 is overloaded from previous braking actions at the beginning of a braking action, the trailer energy signal indicates a drop from the normal trailer energy signal from the beginning of braking on and during the entire duration of the overload.

A more than merely transitory drop of the trailer energy signal for a given energy call-up signal is therefore an indication of an overload of the motor vehicle brake 28. The term "more than merely transitory" in this context has the same meaning as above.

This realization can be used in a further development of the device (1, 7, 24) so that it can also monitor the motor vehicle brake 28 for overload. In this further development, the evaluation circuit 7 is designed so that it emits an output signal also when the actual trailer energy signal has fallen below the normal trailer energy signal in more than a transitory manner. For the further development of device (1, 7, 24), the same configuration possibilities as those which were described above in connection with the monitoring of the trailer brake 18 for overload apply. In this further development, the de-activation of the coupling force control prevents a reduction of the braking force produced by the trailer brake 18 due to a coupling force adjustment being added to the fading of the motor vehicle brake 28. The de-activation of the coupling force control thus ensures the best possible braking of the vehicle train when the motor vehicle brake 28 is overloaded for a given energy call-up signal.

Figure 2:
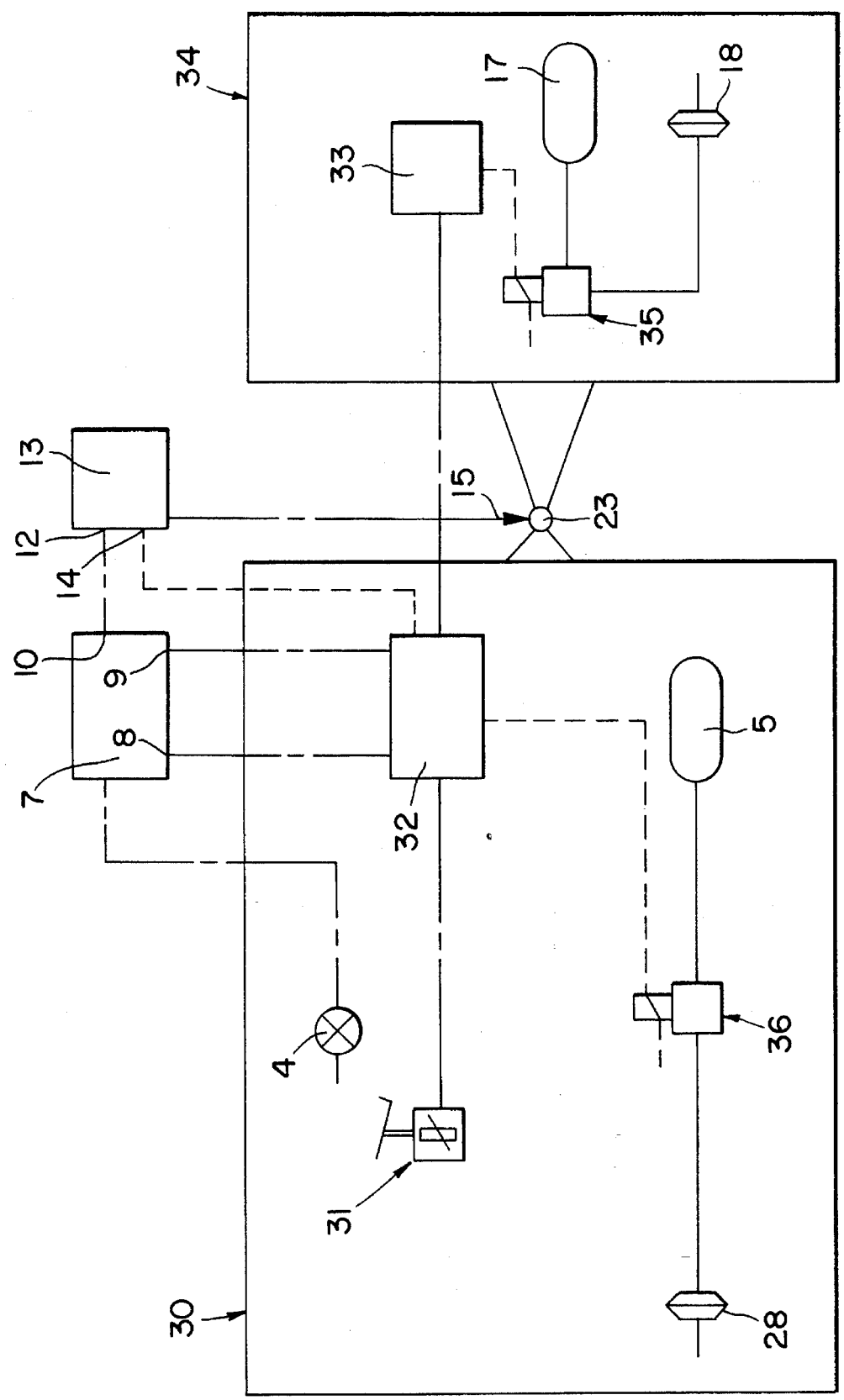
FIG. 2 schematically shows another embodiment of the vehicle train of FIG. 1.

In the vehicle shown in FIG. 2 comprising motor vehicle 30 and trailer 34, different types of energy are used for brake actuation and for its control, namely, electrical energy for control and any kind of energy as the actuating energy in the motor vehicle braking system (5, 28, 31, 32, 36) and in the trailer brake system (17, 18, 33, 35). With pressure being used as the actuating energy, such mixed, systems are in general use in road vehicles and road vehicle trains.

The motor vehicle braking system (5, 28, 31, 32, 36) comprises in this case, in addition to the energy reserve 5 and the motor vehicle brake 28, an electric brake value generator 31, motor vehicle electronics 32 and an energy distributor 36.

The trailer braking system comprises in this case, in addition to the energy reserve 17 and the trailer brake 18, trailer electronics 33 and an energy distributor 35. An input of the trailer electronics 33 is connected to an output of the motor vehicle electronics 32.

The energy distributors 35 and 36 may be the only energy distributors of the motor vehicle 30 or of the trailer 34, but individual energy distributors can also be provided per axle and/or per brake. An energy distributor in a road vehicle or a road vehicle train using pressure as the actuating energy is often called an "electrically actuated pressure modulator."

The output of the brake value generator 31 is connected to an input of the motor vehicle electronics 32.

The energy distributors 35 and 36 are provided with their own energy elements by which they are connected on the one hand to the appertaining energy reserve 5 or 17 and on the other hand to the appertaining brake 28 or 18. Each one of the energy distributors 35 and 36 is furthermore equipped with its own electrical control element the input of which is connected to the output of the corresponding electronics 32 or 33.

When a braking action takes place, the brake value generator converts the energy call-up signal given by the driver into an electrical energy call-up signal which is fed to the motor vehicle electronics 32. The latter edits the energy call-up signal into a control signal for the energy distributor 36. Depending on design details, the motor vehicle electronics 32 here are able to process in a known and therefore not further described manner vehicle parameters supplied in signal form. Upon receiving the control signal, the energy distributor 36 lets energy pass from the energy reserve 5 to the motor vehicle brake 28, the amount of said energy being determined by the value of the control signal fed to the energy distributor 36. Since the motor vehicle electronics 32 are able to process additional signals besides the energy call-up signal, as has been explained, the amount of energy fed to the motor vehicle brake 28 is determined or co-determined (i.e., determined in part) in individual cases by the energy call-up signal.

The motor vehicle electronics 32 also edit the energy call-up signal into a trailer energy signal which is fed to the trailer electronics 33.

The trailer electronics 33 edit the trailer energy signal into a control signal for the energy distributor 35. The information given above concerning the motor vehicle electronics 32 and the energy distributor 36 of the motor vehicle braking system (5, 28, 31, 32, 36) also applies to this editing and the functioning of the energy distributor 35.

This embodiment is also equipped with a coupling force control 23. However, contrary to the previous embodiment, the output 14 of the controller 13 is connected to an input of the motor vehicle electronics 32. The latter process the control signal of the controller 13 and modulate the trailer energy signal accordingly by electronic means. The motor vehicle electronics 32 therefore incorporate the function of the trailer energy setter 26 of the previous embodiment.

In a manner not shown here, it is also possible to feed the control signal of the controller 13 to the trailer electronics 33 to be processed by same. Similarly to the embodiment according to FIG. 1, the trailer energy signal would be adjusted in this case for the purpose of controlling the coupling force in the trailer 34, with the control signal fed to the energy distributor 35 making available the trailer energy signal. In this case, the trailer electronics 33 would incorporate the function of the trailer control device 19 of the previous embodiment.

The embodiment shown in FIG. 2 is also provided with a device to monitor the trailer brake 18 and, if applicable, the motor vehicle brake 28 for overload. Of these, only the evaluation circuit 7 is shown as an autonomous component; its inputs 8 and 9 which receive the energy call-up signal and the trailer energy signal are connected to outputs of the motor vehicle electronics 32 because these signals are detected therein by purely electrical means.

In addition to the evaluation circuit 7, the controller 13 is also depicted as an autonomous component for the sake of greater clarity. However, as a rule, these units are integrated completely or in part into, or are distributed among, the motor vehicle electronics 32 and/or the trailer electronics 33.

The explanations of one embodiment as given above apply directly or in corresponding application also to the other embodiment insofar as they do not contain anything to the contrary.

The person schooled in the art will recognize that the above examples of embodiments do not exhaust the area of protection of the invention but, that this area of protection rather comprises all embodiments whose characteristics fall under the claims of the patent.

We claim:

1. Process for monitoring at least one trailer brake in a trailer attached to a motor vehicle for brake overload, comprising producing an energy call-up signal in said motor vehicle during a braking action, supplying energy to a motor vehicle brake in said motor vehicle, the amount of said energy supplied to said motor vehicle brake being determined at least in part by said energy call-up signal, producing a trailer energy signal based on said energy call-up signal, said trailer energy signal determining at least in part a trailer energy supplied to said trailer brake, monitoring a coupling force appearing at a coupling between said motor vehicle and said trailer, adjusting said coupling force based on said trailer energy signal, and determining that said trailer brake is overloaded when said trailer energy signal rises in more than a transitory manner at a given call-up signal.

2. The process of claim 1 further comprising determining that said trailer brake is overloaded only when the rise in said trailer energy signal reaches a predetermined value.

3. The process of claim 1 further comprising adjusting said trailer energy signal in said motor vehicle in order to adjust said coupling force.

4. The process of claim 1 further comprising adjusting said trailer energy signal in said trailer in order to adjust said coupling force.

5. The process of claim 1 further comprising actuating a warning device when overload of said trailer brake is determined to have occurred.

6. The process of claim 1 further comprising deactivating said adjustment of said coupling force when overload of said trailer brake is determined to have occurred.

7. The process of claim 1 further comprising determining that overload of said motor vehicle brake has occurred when said trailer energy signal drops in a more than a transitory manner at a given call-up signal.

8. An arrangement for monitoring at least one trailer brake in a trailer attached to a motor vehicle for brake overload, comprising means for producing an energy call-up signal in said motor vehicle during a braking action, means for supplying energy to a motor vehicle brake, the amount of said energy supplied to said motor vehicle brake being at least partly determined by said energy call-up signal, means for producing a trailer energy signal the magnitude of which is based on said energy call-up signal, said trailer energy signal at least partly determining a trailer energy supplied to said trailer brake, means for monitoring a coupling force appearing at a coupling between said trailer and said motor vehicle and for adjusting said coupling force in dependence on said trailer energy signal, a motor vehicle energy sensor which detects said energy call-up signal, a trailer energy sensor which detects an actual trailer energy signal, and an evaluation circuit which receives signals from said motor vehicle energy sensor and from said trailer energy sensor, determines a normal trailer energy signal for an actual energy call-up signal, compares said normal trailer energy signal with said actual trailer energy signal, and generates an output signal if said actual trailer energy signal exceeds said normal trailer energy signal for a predetermined length of time.

9. The arrangement of claim 8 wherein said evaluation circuit generates said output signal only when the difference between said actual trailer energy signal and said normal trailer energy signal reaches a predetermined value.

10. The arrangement of claim 8 wherein said means for monitoring said coupling force and for adjusting said coupling force comprises a force sensor which detects said coupling force, a controller which converts a signal from said force sensor into a control signal and a trailer energy setter located in said motor vehicle which receives said control signal and sets said trailer energy signal based thereon.

11. The arrangement of claim 8 wherein said means for monitoring said coupling force and for adjusting said coupling force comprises a force sensor which detects said coupling force, a controller which converts a signal from said force sensor into a control signal and a trailer energy setter located in said trailer vehicle which receives said control signal and sets said trailer energy signal based thereon.

12. The arrangement of claim 8 further comprising a warning device actuated by said output signal of said evaluation circuit, an input of said warning device being connected to an output of said evaluation circuit.

13. The arrangement of claim 8 wherein said means for monitoring said coupling force and for adjusting said coupling force includes a controller which is switched off by said output signal of said evaluation circuit, an input of said controller being connected to an output of said evaluation circuit.

\* \* \* \* \*